United States Patent [19]

Astfalk et al.

[11] Patent Number: 4,512,944

[45] Date of Patent: Apr. 23, 1985

[54] METHODS OF AND APPARATUS FOR INSULATING A CONDUCTOR WITH A PLASTIC MATERIAL

[75] Inventors: Greg Astfalk, Levittown, Pa.; Timothy S. Dougherty, Roswell, Ga.; Montri Viriyayuthakorn, Trenton, N.J.

[73] Assignee: AT&T Technologies, Inc., Berkeley Heights, N.J.

[21] Appl. No.: 507,262

[22] Filed: Jun. 23, 1983

[51] Int. Cl.[3] .............................................. B29F 3/10
[52] U.S. Cl. ................................... 264/174; 264/1.5; 425/114; 425/133.1
[58] Field of Search ................ 264/174, 1.5; 425/113, 425/114, 461, 133.1

[56] References Cited

U.S. PATENT DOCUMENTS

| | | | |
|---|---|---|---|
| 2,626,427 | 1/1953 | Brown | 425/113 |
| 2,766,480 | 10/1956 | Henning | 425/113 |
| 2,864,126 | 12/1958 | Henning | 425/113 |
| 3,382,535 | 5/1968 | Ferrari | 425/461 |
| 3,404,433 | 10/1968 | Krutchen et al. | 264/174 |
| 3,785,919 | 1/1974 | Hickman | 264/46.1 |
| 3,833,325 | 9/1974 | Ramsey | 425/113 |
| 3,860,686 | 1/1975 | Myers | 264/174 |
| 3,947,173 | 3/1976 | Dougherty | 425/113 |
| 4,280,801 | 7/1981 | Wheeler, Jr. et al. | 264/174 |
| 4,339,298 | 7/1982 | Kanotz et al. | 156/498 |

FOREIGN PATENT DOCUMENTS

| | | | |
|---|---|---|---|
| 538698 | 7/1959 | Belgium | 427/117 |
| 49-44114 | 11/1974 | Japan | 264/45.9 |
| 52-25436 | 7/1977 | Japan | 264/46.1 |
| 56-40536 | 4/1981 | Japan | 425/113 |
| 516720 | 2/1955 | Italy | 425/113 |

Primary Examiner—Jeffery Thurlow
Attorney, Agent, or Firm—E. W. Somers

[57] ABSTRACT

Extruder tooling for directing plastic materials to enclose a conductor (26) being advanced along a path of travel through a core tube (97) and aligned dies includes disc-like flow passages (107, 129) which are disposed concentrically about and perpendicularly to the conductor. This arrangement minimizes conductor tension in a pressure extrusion arrangement by significantly reducing the length of the plastic-to-conductor contact within the extruder. The length and width of each flow passage normal to and along a path of travel are sufficient to provide a uniform distribution of plastic material circumferentially about the conductor and to dissipate stresses which have been induced in the plastic materials. In a tubing arrangement, the length of a cantilevered portion of the core tube is reduced significantly which results in improved concentricity of the plastic material about the conductor.

16 Claims, 17 Drawing Figures

Fig_1

FIG_10

FIG_2

FIG_14

FIG_15

Fig. 3

Fig_4

PRIOR ART

Fig_6

PRIOR ART

Fig_8

Fig_5

Fig_7

Fig_13

Fig_9

PRIOR ART

Fig_16

PRIOR ART

Fig_11

Fig_12

METHODS OF AND APPARATUS FOR INSULATING A CONDUCTOR WITH A PLASTIC MATERIAL

TECHNICAL FIELD

This invention relates to methods of and apparatus for insulating a conductor with a plastic material. More particularly, it relates to methods of and apparatus for insulating a metallic or a lightguide fiber conductor with a plastic material in a manner which minimizes tension in the conductor in pressure extrusion and which provides optimum concentricity of the conductor and the plastic material in tubing extrusion.

BACKGROUND OF THE INVENTION

The covering of a conductor for communications purposes is accomplished by pressure or by tubing extrusion. The conductor is moved through a core tube that is positioned in a cavity of a die and then through an exit orifice of the die. These are well known processes in which a plastic covering material engages the conductor either within the cavity of the die between the core tube and die orifice or is drawn down about the conductor after it leaves the die.

In the above-described pressure extrusion process, it is desirable to minimize the tension in elongated material such as a conductor which is being advanced along a path of travel through an extruder and covered. Undue tension in a metallic conductor such as copper, for example, causes the conductor to stretch which results in a change in its electrical properties. Should the conductor be a coated lightguide fiber, excessive tension may contribute to higher losses in the fiber.

It is conventional for a flow path of the plastic material between the outer surface of the core tube and the die wall to be inclined at an angle to the path of travel of the conductor. This design has been used to provide a transition from a relatively large annulus between the outer surface of the core tube and the die wall to the relatively small die orifice. Seemingly, this transition arrangement which is tapered would reduce the tension on the conductor. However, it has been found that substantial conductor tension still exists in a plastic extruder along the plastic-to-conductor contact length.

In order to reduce conductor tension in a pressure extrusion arrangement, the distance the conductor is moved through molten plastic after leaving the core tube must be reduced. However, once the core tube design is established in a typical die for extruding a covering onto a moving conductor, some dimensions of the die remain fixed and have not been changed. One example is the gum space which is the horizontal distance that the core tube can be moved toward the die orifice before it engages the die wall. As a result, the distance through which the conductor must travel after it leaves the core tube while it is in contact with the plastic material has been shortened by decreasing other dimensions. For example, in at least one arrangement, the distance between the gum space and the exit orifice of the die had been reduced.

The prior art includes U.S. Pat. No. 3,382,535 which issued on May 14, 1968 in the name of A. G. Ferrari. It was recognized therein that because viscous drag on a conductor is directly proportional to the length of a die, short dies permit the extrusion of plastic material on a conductor having a relatively low tensile strength. The above-identified patent discloses a relatively short die having an internal contour which varies from the exit to the entrance and which avoids melt fracture of the plastic material.

For tubing extrusion, wherein the plastic material does not contact a conductor until after the conductor leaves the core tube outside the die orifice, tension is not a problem. However, because an unsupported end of the core tube has a greater cantilevered length than in a pressure extruder, it is more susceptible to deflection. Unintended deflection of the end of the core tube which in a tubing extruder is positioned within a passageway connecting the die cavity with its exit orifice could affect adversely the concentricity of the conductor and its covering. Accordingly, concentricity becomes an important consideration in tubing extrusion.

What is needed and what seemingly is not provided by the prior art is an extrusion arrangement which minimizes conductor tension during pressure extruding and which optimizes control of concentricity in a tubing operation. The sought-after arrangement should be one which permits the retrofitting of existing extruders without undue expense.

SUMMARY OF THE INVENTION

The foregoing problems of conductor tension and insulation concentricity during extrusion have been overcome by methods and apparatus of this invention. A conductor is advanced along a path of travel through a core tube which is positioned in a cavity of a die and through a passageway which connects the cavity with an exit orifice of the die. A supply of plastic material is provided within the cavity at a location which is spaced from the path of travel and which is between the core tube and a wall that defines the die cavity. The method includes flowing the plastic material radially inwardly from the supply along a disc-like flow passage which is disposed concentrically perpendicularly about the path of travel of the conductor. The flow passage has sufficient length in a direction normal to the conductor and width in the direction of the path of travel to provide a uniform distribution of the plastic material circumferentially about the conductor adjacent to an entrance to the passageway and to dissipate stresses which have been induced in the plastic material. This arrangement minimizes the tension in the conductor. Also, it minimizes the length of the passageway which connects the die orifice with the die cavity.

In a pressure extrusion arrangement, a conductor is advanced along a path of travel through a core tube, out of an unsupported end of the core tube and into a portion of the die cavity in which the core tube is positioned. The conductor is advanced through a tapered passageway and a land of a die which connects the tapered passageway with an orifice of the die. Plastic material which is destined to cover the conductor in a layer of insulation is flowed along a feed channel generally in the direction of advance of the conductor. This passage may be an annular tapered channel, for example, which is defined between the core tube and an inner surface of the die cavity. After the plastic material has been flowed along this channel, it is directed radially inwardly toward the conductor along a flow passage which has the above-mentioned length and width characteristics to contact the conductor prior to it being advanced into the tapered passageway. The plastic material encloses the conductor and is sized as it is moved through the tapered passageway, the land and through the die orifice. For pressure extrusion, this arrangement minimizes tension in the conductor by minimizing plastic-to-conductor contact in the die cavity.

In a preferred embodiment, the feed channel converges toward the die opening. However, its convergence must be such that the radial movement of the plastic material along the flow passage into converging engagement with the conductor is over a distance of sufficient length to develop the flow and relax stresses which have been induced in the plastic material.

In a tubing arrangement, the free end of the core tube generally extends to an outer surface to which the die orifice opens or is recessed within the land. After the plastic material leaves the flow passage, it is directed inwardly generally perpendicularly toward the conductor and into engagement with the core tube. Then it is moved along between the walls of the tapered passageway and land and the core tube and out of the die over the conductor. This arrangement reduces the unsupported length of the core tube which allows optimum control of the concentricity of the plastic material and the conductor.

BRIEF DESCRIPTION OF THE DRAWING

Other features of the present invention will be more readily understood from the following detailed description of specific embodiments thereof when read in conjunction with the accompanying drawings, in which.

DETAILED DESCRIPTION

The methods and apparatus of this invention may be used for either the pressure or the tubing extrusion of at least one insulative covering about a conductor. For pressure extrusion, they result in minimal tension and, for tubing, optimum control of concentricity of conductors and insulation. In both types of extrusion, the methods and apparatus of this invention enhance the distribution of a plastic material about the conductor.

Inasmuch as conductor tension is a function of plastic-to-conductor contact length, a die arrangement for applying two concentric layers of insulation will result in a higher tension than one which applies a single layer. Accordingly, the invention will be described first with respect to a pressure extrusion apparatus 20 (see FIG. 1) which is used in the manufacture of a dual insulated conductor 25 (see FIG. 2). The apparatus 20 covers a metallic conductor 26 with two or more concentric layers of insulation which are coaxial with the conductor. For example, an inner layer 27, which may be an expanded, cellular plastic material, provides the primary insulating covering for the conductor from the standpoint of a low dielectric constant. An outer layer 28 or skin, as it is called, may be a more dense plastic material to provide a protective covering. Typically, the inner layer 27 has a thickness of about 3-20 mils whereas the outer layer has a thickness of about 2 mils. See U.S. Pat. No. 3,903,233 which issued on Sept. 2, 1975 in the name of T. S. Dougherty and U.S. Pat. No. 3,860,686 which issued on Jan. 14, 1975 in the name of D. L. Myers, both of which are incorporated referenced hereinto.

Figure 1:
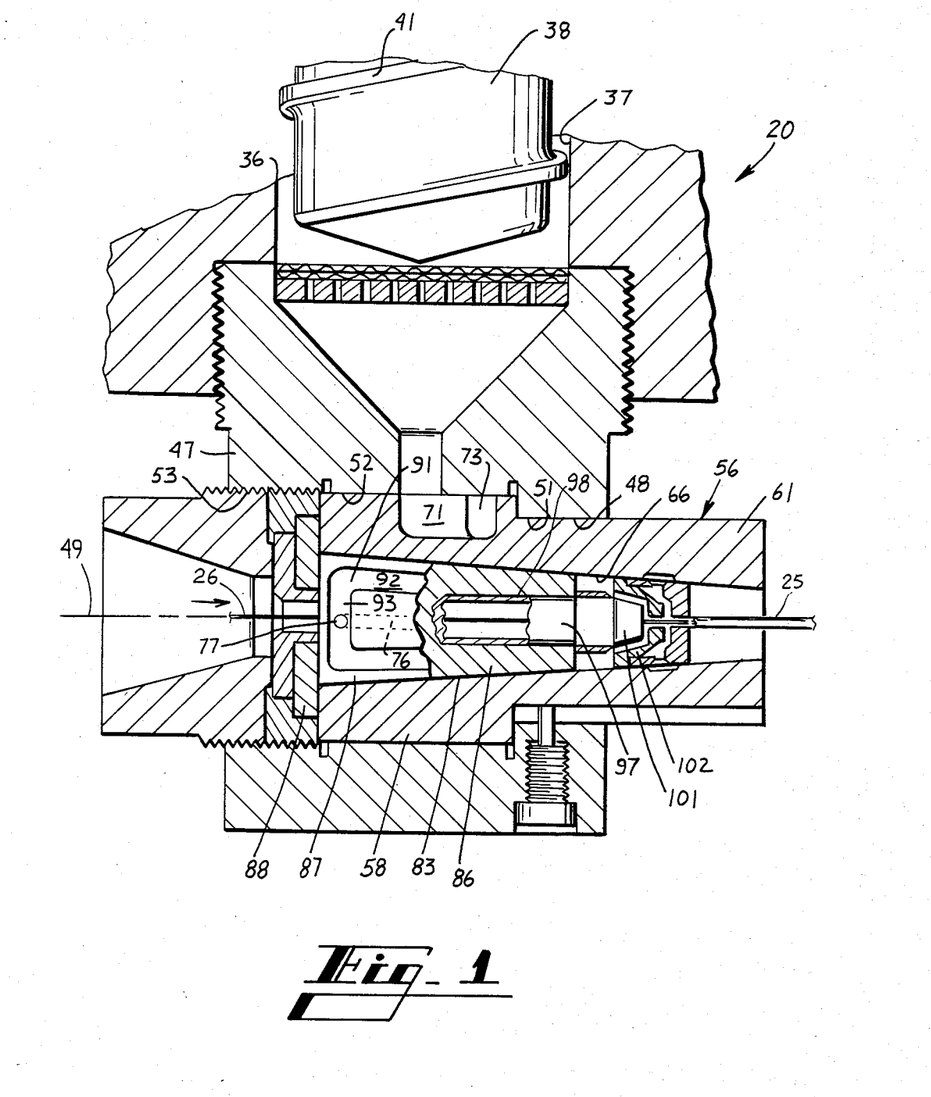
FIG. 1 is a plan view partially in section of an extrusion apparatus of this invention which is used to extrude two layers of insulation onto a conductor being moved therethrough.
Figure 3:
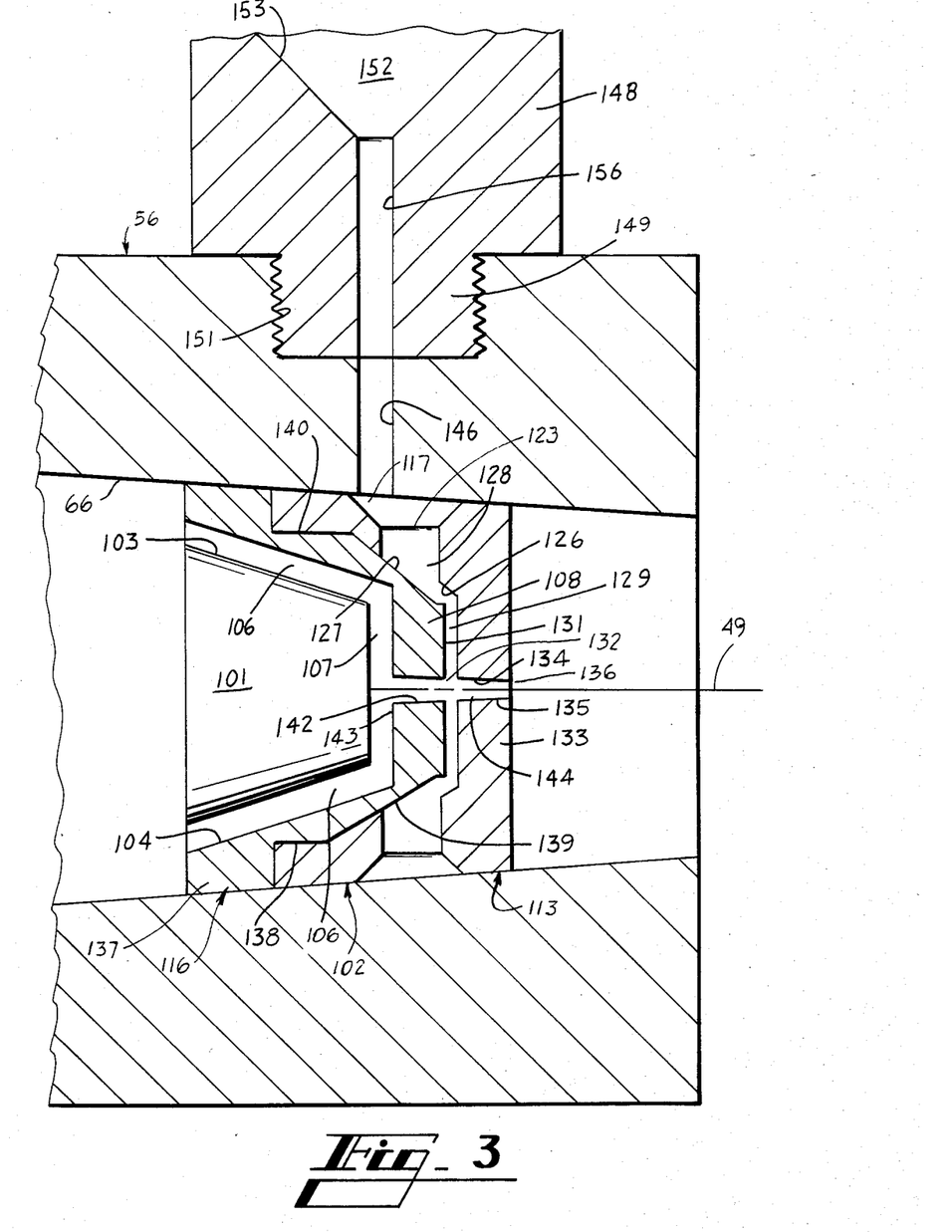
FIG. 3 is an elevational view in section of a portion of the apparatus of FIG. 1.

Referring again to FIG. 1, it can be seen that the extrusion apparatus 20 includes an extrusion barrel 36 formed with a cylindrical bore 37 having a screw 38 mounted for rotation about a longitudinal axis therein. The barrel 36 is adapted to provide the plastic material for the inner layer 27. A second barrel which supplies the plastic material for the outer layer is best seen in FIG. 3. A helical thread 41 which is formed on the screw 38 works and advances the plastic material for the inner layer 27 along the bore 37 toward a delivery end thereof. The delivery end communicates with an axial extrusion passageway of a chamber 48 formed in an extrusion head 47 in a relationship with the bore 37 which minimizes piping. The conductor 26 is advanced longitudinally and axially along a path of travel 49 through the chamber 48 wherein the layers 27 and 28 of insulation are formed concentrically about. As shown in FIG. 1, the chamber 48 includes a bore 51, a counterbore 52 and a tapped section 53 coaxial therewith.

A generally cylindrical capsule 56 (see FIGS. 1 and 3) is removably retained in the chamber 48. The capsule 56 includes an enlarged cylindrical portion 58 and a smaller cylindrical portion 61 which is disposed in the bore 51. The capsule 56 is provided with an axial opening 66. The outer periphery of the enlarged portion 58 is formed with a U-shaped channel system for guiding the expandable plastic material from the main extrusion bore 37. It includes a central channel leg 71 which intersects and communicates with a circumferential channel leg 73 communicating with a pair of diametrically opposed longitudinal channel legs 76—76. A radial bore 77, communicating with the axial opening 66, is formed in the enlarged portion 58 of the capsule 56 in the terminal end of each of the outer channel legs 76—76.

A core tube holder 83, having a generally frustoconical body 86 extending from a cylindrical member 87, having a flange 88 formed thereon, is removably fitted within the opening 66 of the capsule 56. The outer periphery of the holder 83 is formed with a pair of diametrically opposed U-shaped channels 91—91, each of which includes a pair of elongated channel legs 92—92 connected by an arcuate channel leg 93. The radial bores 77—77 communicate with the central portions of the arcuate legs 93—93. The legs 92—92 are spaced equally about the axis of the core tube holder 83.

A core tube 97 having a tip 101 is removably retained within an axial bore 98 formed in the holder 83. The tip 101 of the core tube 97 projects into an entrance portion which is formed in a separable channeled die 102 (see FIG. 3), having a generally frustoconical outer surface and being positioned at the leading end of the opening 66.

Facilities are provided for directing a flow of the expandable plastic material for the inner layer 27 from the legs 92—92 toward the conductor 26 which is being advanced along the path of travel 49. An outer surface 103 of the tip 101 of the core tube 97 and a converging surface 104 of the die 102 form an annular feed channel 106. The annular feed channel 106 communicates with a disc-like flow passage 107 adjacent to a wall 108 of the die 102. As can be seen in FIG. 3, the flow passage 107 is perpendicular to the path of travel of the conductor 26 and is disposed concentrically thereabout.

The plastic material for the outer layer 28 of the insulated conductor 26 is delivered to the die 102 from a vertical extruder (see FIG. 3). It is applied in a confined passageway in the die to the conductor 26 simultaneously with the plastic material for the inner layer 27.

Figure 4:
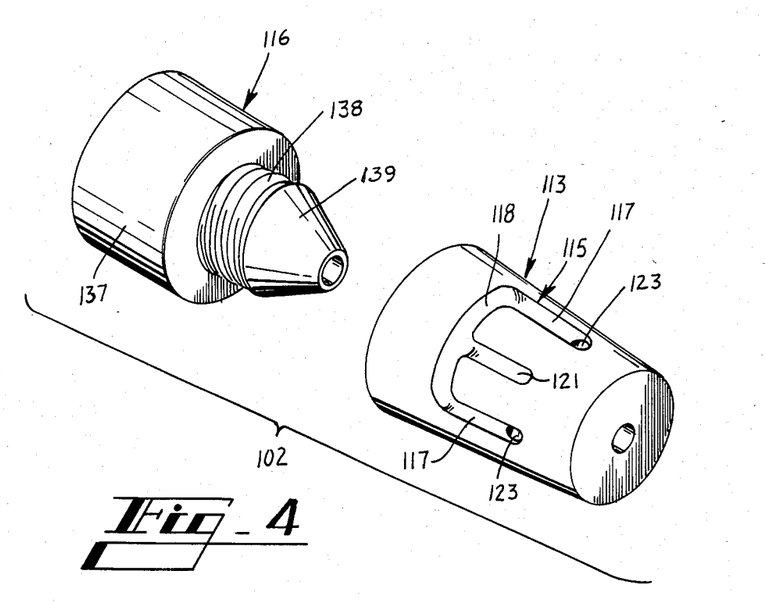
FIG. 4 is an exploded view of a portion of the extruder of FIG. 1.

Referring to FIG. 4, it can be seen that the die 102 includes first and second coaxial mating portions 113 and 116. The portion 113 includes a plurality of guide channels which divide the plastic material for the outer layer 28 into balanced streams which are impinged concentrically around the inner layer 27 on the conductor 26 in the die passageway.

The portion 113 includes two channel networks each designated 115. Each channel network 115 includes first and second longitudinal channel legs 117—117 which intersect and communicate with a circumferential channel leg 118. The leg 118 communicates with a third longitudinal channel leg 121. The leg 121 terminates at the junction with the channel 118. Each of the longitudinal channel legs 117—117 terminates in a radial bore 123. The bores 123—123 communicate with an annular portion 126 formed between the portions 113 and 116 (see FIGS. 3 and 5). An outer surface 127 of the portion 116 cooperates with the bore 126 to form an annular feed channel or manifold 128.

The feed channel 128 is adapted to deliver the plastic material for the outer layer 28 to a disc-like flow passage 129 which directs it into engagement with the expandable inner layer 27 on the conductor 26. The flow passage 129 is formed between a leading end 131 of the portion 116 in which a first die orifice 132 is formed and a downstream wall 133 of the portion 113 of the die 102. Like the flow passage 107, the flow passage 129 is perpendicular to the path of travel 49 of the conductor 26 and is disposed concentrically thereabout.

A frustoconical bore 134 formed in the portion 113 communicates with the flow passage 129 and a land 135 to complete a passageway through the portion 113. The land 135 comprises a cylindrical passageway having a length which is equal to about one diameter of the conductor 26 and terminates in a second die orifice 136.

The portion 116 includes an enlarged base 137 (see FIGS. 3 and 4). A threaded portion 138 connects the base 137 with a frustoconical tip 139 which defines the annular feed channel 128 adjacent to the threaded portion.

The portions 113 and 116 are assembled together to form the die 102 by turning the threaded portion 138 of the portion 116 into a tapped bore 140 of the portion 113. When the portions 113 and 116 are assembled, they define the annular passage or manifold 128 which communicates with the flow passage 129 defined between the leading end 131 of the portion 116 and the wall 133 of the portion 113. The radial bores 123—123, which are spaced equally around the circumference of the portion 113, form a path between the channel legs 117—117 and the manifold 128.

A frustoconical bore 142 extends coaxially from the entrance portion 143 of the die 102 through the portion 116 thereof and terminates in the first die orifice 132. The bore 134 in the portion 113 and the bore 142 in the portion 116 of the die 102 are coaxially aligned when the portions are assembled, coverging at the same conical angle, which is approximately 5°, and defining a throat 144 that communicates with the land 135.

The die 102 is positioned at the forward end of the capsule 56 with each channel leg 121 communicating with a vertical feed port 146 (see FIG. 3) formed in the capsule 56. A fitting 148, which is connected to an extruder barrel (not shown) that delivers the plastic material for the outer layer 28 has a threaded cylindrical projection 149 which is turned into a tapped bore 151. The fitting 148 is formed with a passageway 152 which includes a tapered bore 153 and a coaxial smaller bore 156 extending therefrom. The bore 156 splits to divide the flow of the plastic material for the outer layer 28 into the two feed ports 146—146 associated with the two channel legs 121—121.

Figure 5:
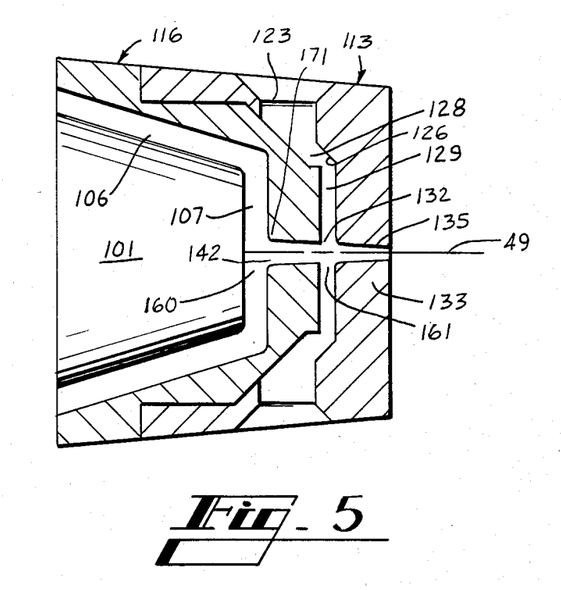
FIG. 5 is a view of a portion of the extruder of FIG. 1 to show facilities which minimize conductor tension.

In a preferred embodiment of this invention shown in FIG. 5, the feed channel 106 and the flow passage 107 function to discharge the plastic material for the inner layer 27 into a chamber 160 between the front end 101 of the core tube 97 and the entrance to the bore 142. The chamber 160 communicates with the first die orifice 132 through the bore 142 which may be tapered. On the other hand, a chamber 161 (see again FIG. 5) communicates with the second die orifice 136 through the bore 134 and the land 135 of the die. The expandable plastic material is moved from its chamber 160 through the tapered passageway 142 to the chamber 161 into which is fed the plastic material which is destined to form the skin. The skin plastic covers the expandable plastic and the two layers are moved along with the conductor 26 through the land 135 and out the die orifice 136.

Figure 6:
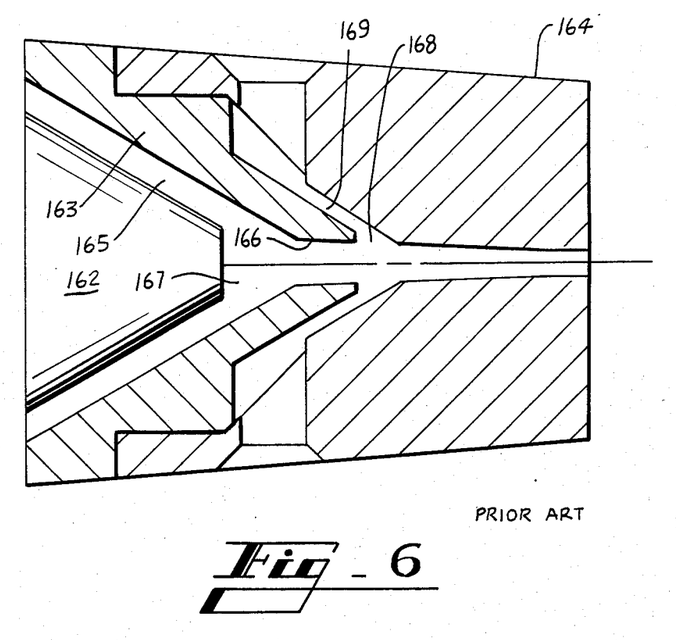
FIG. 6 is an elevational view in section of a prior art arrangement for dual insulating a metallic conductor with two layers of insulation.

In order to more clearly understand how this invention provides desirable flow characteristics, minimal tension and optimum concentricity, attention now is directed to FIGS. 5 and 6. FIG. 6 is a detail view of a portion of a prior art extruder taken in the vicinity of a die whereas FIG. 5 is a view of the same portion of the extruder as modified in accordance with this invention. In FIG. 6 there is shown a core tube 162 which cooperates with a wall 163 of a die 164 to form an annular passage 165 which coverges toward a passageway 166.

The passageway 166 joins a portion 167 of the die cavity for the expandable plastic material with a portion 168 for the solid plastic material. As can be seen in FIG. 6, the flow passage 165 and a flow passage 169 for the solid plastic are substantially unbroken until they intersect the conductor 26 which is being moved through the crosshead.

The prior art has taught that the plastic material should be brought into engagement with the conductor at an angle less than 90°. It was thought that this would provide a component of flow that would help to overcome the drag of the plastic. However, it has been found that inertial effects of the plastic material are almost negligible compared to viscous effects.

Through experimental and numerical studies, it has been determined that the plastic material flows perpendicularly of the conductor 26 to contact it. Because of factors such as the high viscosity of the plastic material, the clearance between the core tube and the die, the line speed and die entrance angle, for example, the conductor 26 drags more plastic forward than is required for its cover. This is balanced by a counterflow of the plastic material driven by an adverse pressure gradient. As the plastic material is moved into the die, the pressure increases in a reverse direction which results in a recirculation of the plastic material. This causes those portions of the plastic material to remain in the chambers upstream of each die for a longer time which could result in its degradation. Also, this recirculation does not serve a useful function; it simply results in a so-called dead spot.

This problem has been overcome by moving the plastic material from the feed channels 106 and 128 along additional flow passages 107 and 129 and then into engagement with the conductor 26. With reference to FIG. 5, it can be seen that each plastic material is directed inwardly toward the conductor along an annularly converging flow passage. For the cellular plastic, this is along a feed channel 106, and for the solid plastic, along a feed channel 128. The flow passages 107 and 129 are perpendicular to the path of the conductor to direct plastic material radially inwardly toward the conductor. The additional flow passages interposed between the feed channels and the conductor 26 substantially eliminate recirculation of the plastic materials.

The use of a flow path for each of the plastic materials which has been subdivided into the feed channel between the outer surface of the core tube and the die cavity wall and the flow passage normal to the conductor results in minimal conductor tension. This is accomplished by shortening significantly the portion of the die along which the plastic material first contacts the conductor 26.

Figure 7:
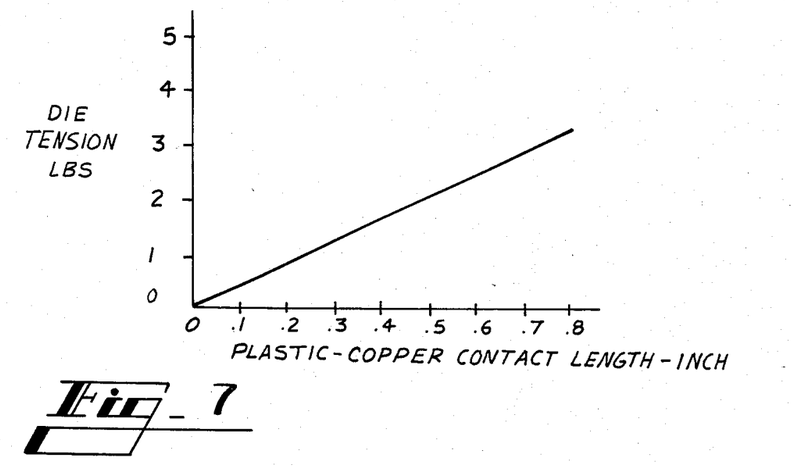
FIG. 7 is a graph which shows conductor tension plotted as a function of plastic-to-copper conductor contact length within the extruder.
Figure 8:
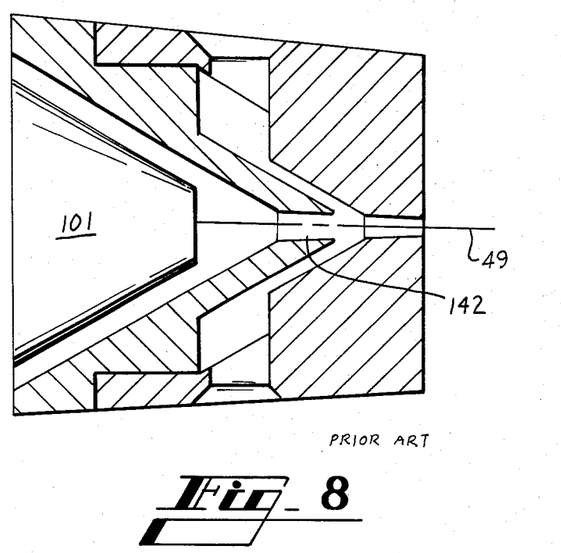
FIG. 8 is a portion of a prior art extruder which has been modified to reduce conductor tension.

As can be seen in FIG. 7, the tension in a copper conductor caused by movement through a die is a function of the length of contact between the plastic material and the conductor. It has been found that the tension in a 26 gauge copper conductor being insulated with the hereinabove-described dual insulation is about 3 lbs. when using the die arrangement in FIG. 6. The magnitude of the tension can be reduced somewhat by using the arrangement in FIG. 8. There the length of the passageway 142 which interconnects the two chambers 160 and 161 has been shortened over that shown in FIG. 6. Also, the length of the land and its approach passageway has been shortened over that shown in FIG. 6. However, the use of the core tube and die arrangement of this invention (see FIG. 5) results in a die tension of about 1.5 lbs. which is substantially less than that achieved with the arrangement shown in FIG. 8 as well as over that shown in FIG. 6.

Figure 9:
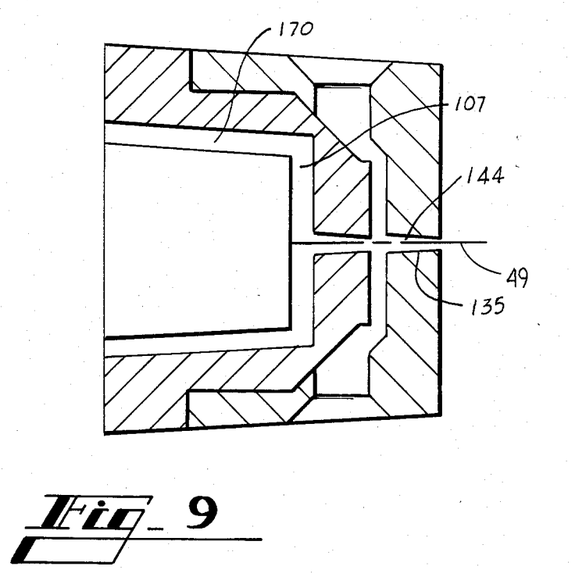
FIG. 9 is a detail view of an alternative embodiment of the portion of the extruder which is shown in FIG. 5.

It should be realized that the feed channel 106, for example, between the core tube 97 and other portions of the die need not be converging as shown in FIG. 5. Instead, it could parallel the conductor path. Then the flow passage 107 would be perpendicular not only to the conductor 26 but also to a flow passage 170 (see FIG. 9). What is important is that each flow passage is perpendicular to the path of the conductor 26. This results in minimal conductor tension and eliminates substantially recirculating pools of plastic in the vicinity of the gum spaces.

The feed channels 106 and 128 for the inner and outer layers, respectively, and the flow passages 107 and 129 provide a balanced flow for highly viscous or highly elastic plastic materials. As the plastic material is flowed through the extruder, flow instabilities may be experienced. Instabilities occur because of the elastic nature of the flow of the plastic material. They may exist within portions of the extruder and not be manifested as such until the conductor 26 exits the extruder die where they appear as irregularities on the surface of the plastic insulation. Or, instabilities may occur within the extruder and not be manifested outside.

Potential sources of instabilities may occur upstream and downstream with respect to each flow passage 107 and 129. An upstream instability is one which occurs for example in the vicinity of the junction of the feed channel 106 and the flow passage 107. A downstream instability is defined as one at the entrance to the bore 134 which communicates with the land 135 and occurs as the plastic material turns from the flow passage 129 into that bore. Flow instabilities may be explained with respect to recoverable shear.

Recoverable shear is a measure of the ratio of the importance of elastic forces to viscous forces. If that ratio is relatively high, the elastic forces are significant as compared to the viscous forces. An elastic fluid implies that the fluid has memory and that it can store energy that is imparted to it by velocity gradients, for example, such as when the plastic material is moved through a turn in its path. Viscous forces are offered by the plastic material as resistance to flow. Recoverable shear is telltale of which forces are dominant.

Of importance in avoiding flow instability is the lead-in length of each of the flow passages from the feed channels to the vicinity of the conductor 26 and from there to the exit orifice of the associated die. In view of the foregoing discussion on recoverable shear, the movement of the plastic material in a converging radial manner must be done to allow sufficient time for the stresses in the plastic material to be relaxed before exiting the die. The length of each must be sufficient to develop the polymer flow and avoid instability. If the plastic material which has experienced an instability is allowed sufficient time to flow without that instability being amplified such as, for example, by being directed around another turn with additional stresses being induced therein, then the plastic material will relax. If nothing occurs to reinforce the stored energy, it is dissipated with the flow over a given distance. However, it may be reinforced or increased such as for example by being moved around a sharp bend, because it has not had time within which to relax. If the lead-in length of either flow passage is too short, the polymeric material is fed too rapidly through an S-shaped path which could result in a flow instability. Also, if the exit orifice of a die is too close to a source of energy or elastic forces, such as a turn from a flow passage, flow instabilities will be encountered.

Important to the geometrical definition of the die is the length-to-width ratio of each of the flow passages 107 and 129. The length of the flow passage 107, for example, is the distance from its intersection with the feed channel 106 to the conductor 26 and the width is its dimension measured along the conductor path of travel. If this ratio is too large, a relatively high back pressure may occur which makes the extrusion process, particularly the expansion part of it, difficult to control. If too small, then the plastic material will have had insufficient time to relax after having been moved around the bend at the junction with the feed channel 106. A range for this ratio in a typical extruder of this invention is about 3 to 10.

Another important consideration with respect to the length-to-width ratio of the flow passage concerns the distribution of the plastic material about the conductor 26. If this ratio is too small either because of a short length or a large width, the distribution of the plastic material about the conductor 26 will be nonuniform.

What is important to achieving minimal conductor tension and optimum plastic distribution is the geometry of the flow passages 107 and 129. The plastic material may be supplied to those flow passages along annular feed channels 106 and 128 or along separate longitudinally extending channels or from a separate supply adjacent to the downstream wall of the die. The flow passages 107 and 129 must be sufficient to allow recovery of the plastic materials from stresses induced therein by turning corners in flow paths and to insure a uniform distribution of the plastic materials about the conductor.

Should the lengths of the flow passages 107 and 129 not be long enough to dissipate the stored energy caused by the turns from the feed channels 106 and 128, respectively, the stresses will be reinforced as the plastic materials turn in toward the bore 142 and the land 135. As a result, the length of the passageway comprising the bore 142 and the length of the passageway comprising the bore 134 and land 135 would have to be relatively long to allow recovery and prevent insulation surface imperfections. On the other hand, if the length-to-width ratios are sufficient to allow the plastic materials to recover from the elastic forces, these passageway lengths can be shortened and need be long enough only to allow recovery from the stresses caused by the turn of the plastic materials thereinto.

The reduced distances between the end of the core tube and the entrance of the bore 142 and between the die orifice 132 and the entrance to the bore 134 together with the reduced passageway lengths minimizes the conductor-to-plastic contact. The tension in the conductor 26 is minimized as a result of this arrangement.

Recovery from stresses in conventional prior art dies is accomplished with lengthy, gradually tapering paths along which the plastic material recovers. However, as mentioned hereinbefore those dies cause undue tension in a conductor being advanced therethrough because of substantial plastic-to-conductor contact length.

Further definition of the flow passages 107 and 129 from the outer passages to the conductor 26 is helpful in avoiding instability. In the preferred emboidment shown in FIG. 5, the intersections or corners created between portions of the flow paths should not be sharp but rather should be radiused. For example, a radiused corner 171 (see FIG. 5) is provided adjacent to the die wall 108 between the gum spaces. As a result, any instabilities caused by sharp turns at the intersection of the flow channels become relaxed by the time the plastic engages the conductor 26. Otherwise high stresses may be imparted to the plastic material which would increase the relaxation time.

Figures 2, 10, 14:
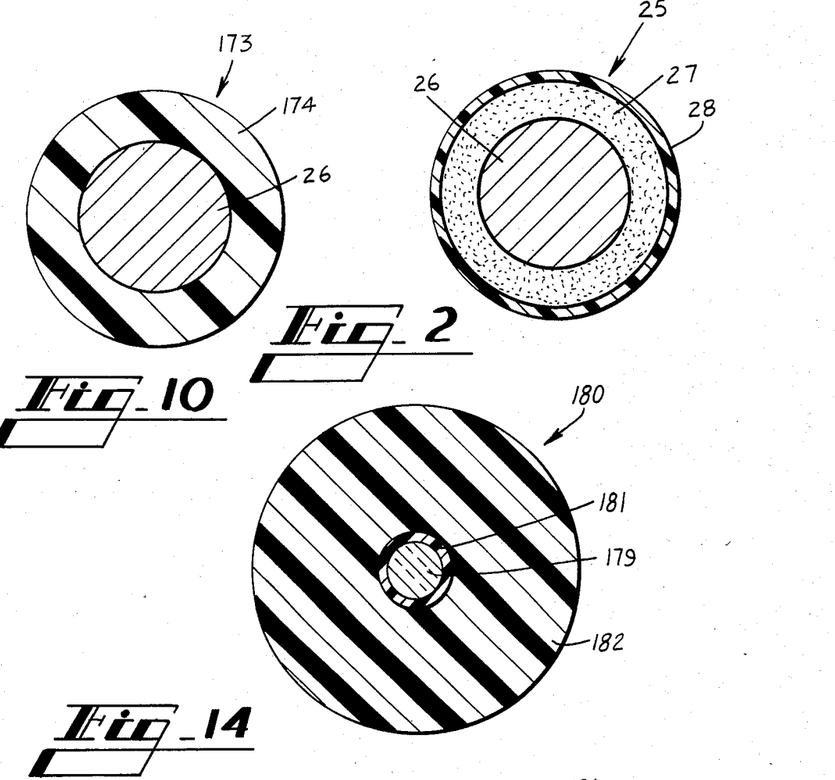
FIG. 2 is a cross-sectional end view of a produce which is made with the apparatus shown in FIG. 1.
FIG. 10 is an end sectional view of a conductor which is covered with a single layer of insulation.
FIG. 14 is an end sectional view of a lightguide fiber cable.
Figure 11:
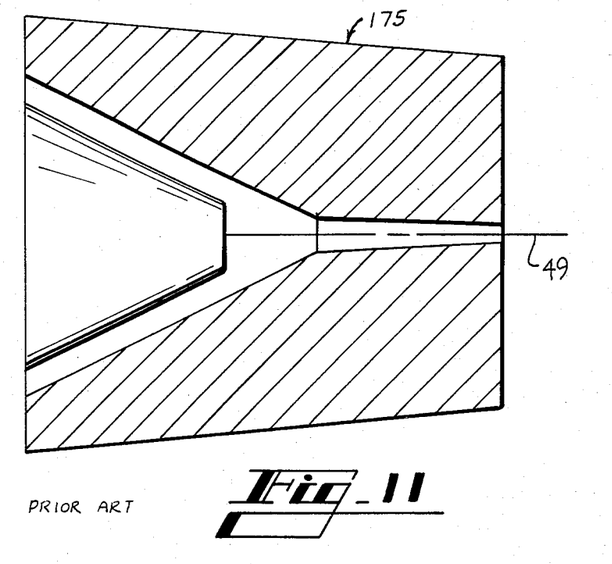
FIG. 11 is an elevational view in section of a prior art extrusion apparatus which is used to cover a conductor with a single layer of plastic insulation.
Figure 12:
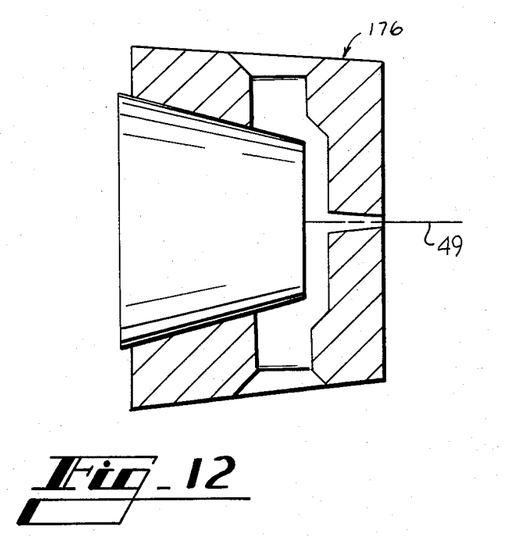
FIG. 12 is an elevational view in section of an extrusion apparatus of this invention which is used to cover a conductor with a single layer of insulation.

It should be realized that this invention is useful not only with respect to the manufacture of a dual coated conductor but also to one designated 173 and having a single layer of insulation 174 (see FIG. 10). A conventional die 175 which is used for single layer insulating is shown in FIG. 11. One in accordance with this invention is shown in FIG. 12 and is designated 176. A comparison of FIGS. 11 and 12 shows the significantly shortened plastic-to-conductor contact length between the exit of the conductor 26 from the core tube and its exit from the single die orifice.

Another advantage of this invention relates to the core tube 97. The core tube 97 through which an elongated substrate material such as the conductor 26 is advanced is generally conically shaped with a passageway being formed therethrough. A downstream end of the core tube is truncated to form a relatively blunt tip having a diameter of about 0.125 inch. A tip of the core tube which converges almost to a point would be too fragile to use in manufacturing. It had been thought that a sharp-tip core tube would avoid recirculation of the plastic material. However, the hereinbefore-mentioned experimental studies have shown that recirculation does not occur adjacent to the core tube but rather adjacent to the die wall. Therefore, the tooling of this invention allows the tip or free end of the core tube 97 to be blunt thereby improving the ruggedness of the core tube while reducing substantially the recirculation of the plastic material. Damage to the core tube during cleaning and handling is thereby avoided.

Figure 13:
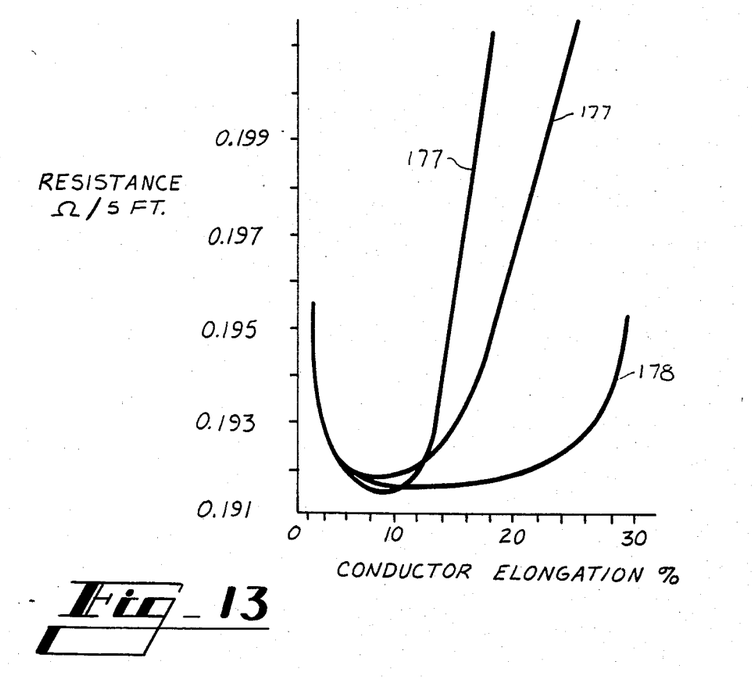
FIG. 13 is a graph which shows the resistance of a metallic conductor as a function of conductor elongation during annealing and insulating.

Still another advantage of this invention comes about on an insulating line where a metallic conductor is annealed prior to being insulated. As the conductor is annealed to increase percent elongation, the yield point of the metallic material is reduced. This will result in a dramatic increase in resistance (see FIG. 13) after the tensile stress exceeds the yield point and the conductor begins to stretch. Curves 177—177 are characteristic for insulating lines in which prior art dies are used. An operator who is monitoring the operation of the line must work along a relatively steep part of the curve in order to obtain a desired percent elongation. A slight change in annealer voltage causes a significant change in resistance, but only a slight change in percent elongation. A curve 178 results from the use of the extruder tooling of this invention on an insulating line. The right hand portion of the curve remains somewhat steep but is shifted to the right. Not as much stretch occurs in the conductor and sensitivity to the annealer voltage along a significant portion of the curve is decreased. The portion of the curve along which the operator adjusts the percent elongation is relatively flat. As a result, the operator is better able to control resistance at higher elongation values.

Pressure extrusion is also used in the manufacture of several lightguide products. The foregoing description of this invention has been directed to a pressure extrusion environment either for a metallic or lightguide fiber conductor. Because of the significantly shorter plastic-to-conductor contact length, the conductor tension is reduced significantly. For example, in the manufacture of one lightguide cable 180 (see FIG. 14), there must be substantial adhesion between successive coverings over a fiber 179 and coating 181 so that the sheath system which includes a plastic cover 182 carries the load. In those, this invention is used to reduce conductor tension.

When terminating or splicing lightguide fiber cables, it may become necessary to remove several feet of insulation. Because of the relatively small sizes involved, e.g. a coated fiber diameter of about 10 mils, it is important that the insulation be concentric with the fiber to avoid nicking of the fiber. This generally is not a problem in pressure extruding a cover for a product such as that shown in FIG. 14. However, in another cable 190 which is shown in FIG. 15, a jacket 191 is spaced from the core by an air space 192 to allow relative movement between the fiber 179 and the jacket.

Figure 15:
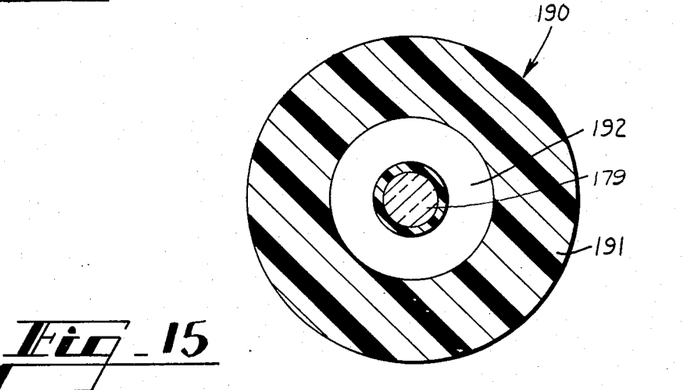
FIG. 15 is an end sectional view of another lightguide fiber cable.
Figure 16:
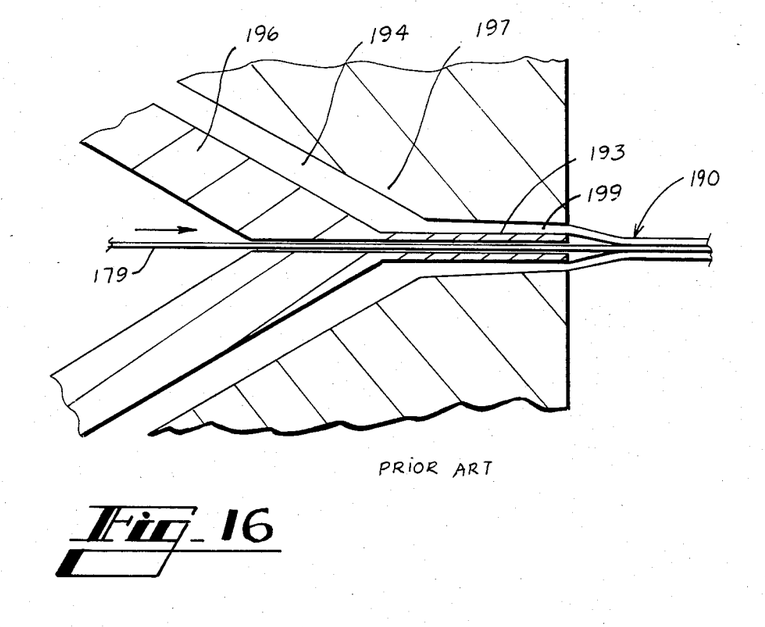
FIG. 16 is a detail view of a portion of a prior art tubing extruder.

The product shown in FIG. 15 is produced by tubing extrusion process. In a tubing process, it is commonplace to have a tip 193 of the core tube recessed within the die land or be flush with the die orifice (see FIG. 16). The portion of the core tube within the land has a diameter which is less than that of the land to allow plastic material to be moved therebetween and out of the die to be tubed into engagement with the conductor. In a conventional tubing extruder, a flow passage 194 between the outer surface of a core tube 196 and the die wall 197 converges to a passageway which leads to a die land 199. Consequently, the leading end of the core tube is sharply tapered and is connected to a portion which extends through the die land 199. The leading end portion which extends through the die land is extremely fragile.

Of course, in tubing, the plastic material does not contact the conductor until after the plastic material has been moved out of the extruder beyond the core tube. This obviates the concern regarding plastic-to-conductor contact. However, this invention provides at least one advantage in a tubing operation.

With prior art tubing extrusion apparatus in which there is a long gradual lead-in of the plastic material, the unsupported end of the core tube necessarily was cantilevered a substantial distance from its portion that was turned threadably into a wall of the extruder. This caused problems in maintaining control of the alignment of the core tube and die. Misalignment results in non-concentric coatings. As a result, continued alignment of the core tube and die opening has been somewhat difficult to maintain.

Because of the subdivided flow path of this invention which includes flow passages that are normal to the core tube, the length of the truncated unsupported portion of the core tube may be shortened considerably. When it is remembered that the core tube is cantilevered from one end of the extruder to the die opening (see FIG. 16), it is realized that the shortening of the truncated portion results in a reduction of the unsupported length.

Figure 17:
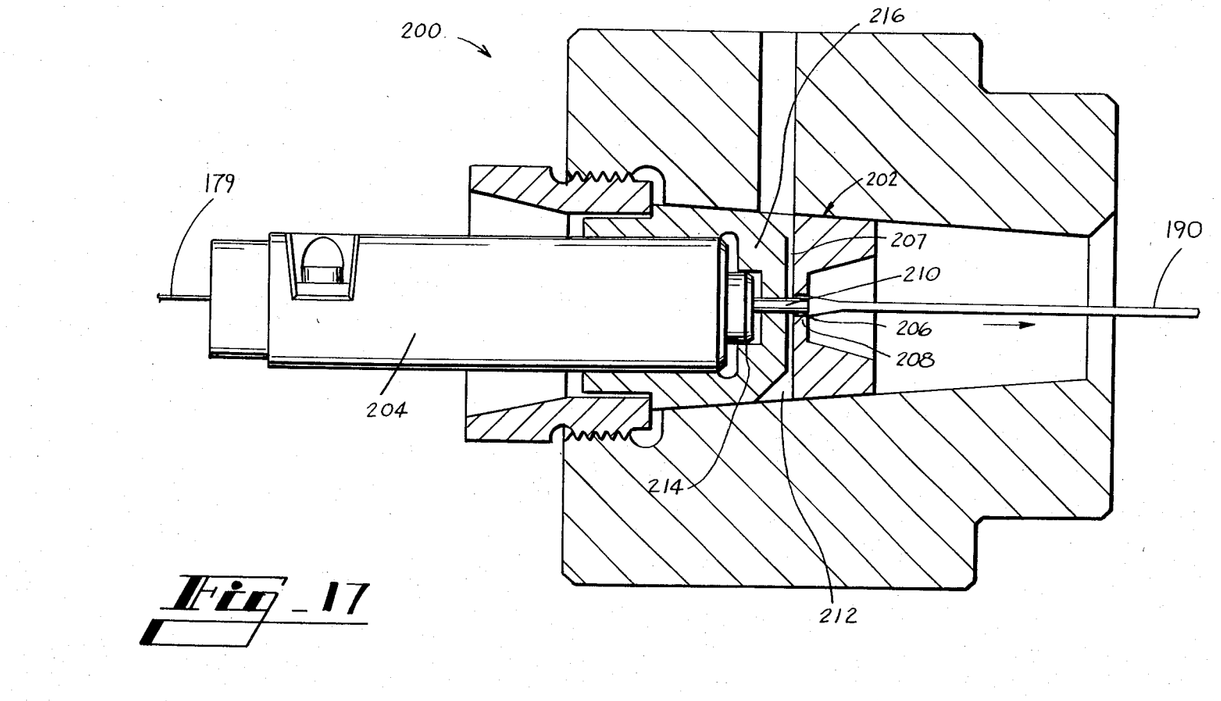
FIG. 17 is a cross-sectional view in elevation of a portion of a tubing extruder of this invention for making a lightguide fiber cable.

With the methods and apparatus of this invention, the length of initial contact of the plastic material with the outer surface of the core tube is shortened considerably (see FIG. 17). This makes it much easier to control and to maintain the position of the free end of the core tube relative to the die opening thereby improving the control of the concentricity of the plastic material about the conductor.

As can be seen in FIG. 17, a tubing extruder 200 includes a single die 202 and a core tube 204. The die 202 includes an exit orifice 206 which provides the layer 191 about the coated fiber and which communicates with a flow passage 207 through a tapered passageway and land 208. An end portion 210 of the core tube 204 extends through the land 208 and is flush with the die orifice 206. The width of the feed channel 207 is equal to the gum space for this arrangement. The flow passage 207 communicates with a source of plastic material for the layer 191 through an annular feed channel 212. It should also be observed from FIG. 17, that an end 214 of the main body of the core tube 204 is spaced from a wall 216 of the die.

Assuming a 20 mil gum space and a 50 mil tapered passageway and land, the core tube 204 may be moved rearwardly to increase the pressure in the gum space to facilitate pressure extrusion or moved outwardly to be flush with the die to facilitate a tubing operation. This arrangement allows a hypodermic needle to be inserted through the core tube 204 of the extruder 200 to provide the extension 210. In such an arrangement, the needle extends rearwardly of the core tube and the coated lightguide fiber is advanced through it. Although the tip of the needle is fragile, the length of its portion 210 which is cantilevered from the main body of the core tube is shortened considerably from prior art extruders. Also, the tip is easily replaceable and provides optimum centering with the land 208.

It is to be understood that the above-described arrangements are simply illustrative of the invention. Other arrangements may be devised by those skilled in the art which will embody the principles of the invention and fall within the spirit and scope thereof.

What is claimed is:

1. A method of extrusion covering a conductor with a plastic material, said method comprising the steps of:
    advancing a conductor along a path of travel through a core tube which is positioned in a cavity of a die and through a passageway which connects the cavity with an exit orifice of the die;
    providing a supply of a plastic material at a location which is spaced from the path of travel; and
    causing the plastic material to be moved from the supply radially inwardly toward the conductor through a disc-like flow passage which is disposed concentrically about and perpendicularly to the path of travel, the flow passage having a width which is sufficiently small to minimize the distance along the path of travel through which the core tube can be moved before it engages a wall that defines the die and a length which is normal to the path of travel and which cooperates with the width to provide a uniform distribution of the plastic material circumferentially about the conductor adjacent to its entrance into the passageway and to dissipate stresses which have been induced in the plastic material.

2. A method of extrusion covering a conductor with a plastic material, said method comprising the steps of:
    advancing a conductor along a path of travel through a core tube which is positioned in a cavity of a die and through a passageway which connects the cavity with an exit orifice of the die;
    flowing a plastic material along a feed channel which is defined between an outer surface of the core tube and an inner surface of the die cavity and in a direction generally toward the exit orifice of the die; and
    directing the plastic material from the feed channel radially inwardly through a disc-like flow passage which is disposed concentrically about and perpendicularly to the path of travel toward the conductor between an unsupported end of the core tube and an entrance to the passageway, the flow passage having a width which is sufficiently small to minimize the distance along the path of travel through which the core tube can be moved before it engages a wall that defines the die and a length which is normal to the path of travel and which cooperates with the width to cause the plastic material to be distributed uniformly circumferentially about the conductor adjacent to the entrance to the passageway and to dissipate stresses which have been induced in the plastic material.

3. The method of claim 2, wherein the conductor is engaged by plastic material between an end of the core tube and the passageway and wherein the feed channel which is defined between an outer surface of the core tube and an inner surface of the die cavity is annular, the width of the flow passage being sufficiently small to minimize tension in the conductor.

4. The method of claim 3, wherein the conductor is enclosed in two concentric coatings of plastic material with each plastic material being directed along an annular feed channel which converges in the direction in which the conductor is being advanced, and said step of directing plastic material from the converging annular feed channels includes directing each of the two plastic materials independently inwardly toward the conductor.

5. The method of claim 3, wherein the feed channel converges toward the exit orifice of the die.

6. The method of claim 3, wherein the feed channel is parallel to the path of travel of the conductor.

7. A method of tubing a plastic material about a conductor, said method including the steps of:
providing a die having a cavity and an exit orifice which communicates with said cavity through a passageway;
positioning a core tube within the cavity to cause a free unsupported end of the core tube to extend at least into the passageway;
advancing a conductor along a path of travel through the core tube, past an entrance to the passageway, through the passageway and beyond the die;
flowing plastic material along a feed channel which is defined between an outer surface of the core tube and an inner surface of the cavity and in a direction generally toward the exit orifice; and
directing the plastic material from the feed channel radially inwardly toward the core tube through a disc-like flow passage which is disposed concentrically about and perpendicularly to the path of travel and which has a length normal to the core tube and a width which is the distance along the path of travel through which the core tube can be moved before it engages a wall that defines the die and which is sufficiently small to minimize the unsupported length of the core tube, the length and width being sufficient to cause the plastic material to become distributed uniformly circumferentially about the core tube adjacent to the entrance to the passageway and to dissipate stresses which have been induced in the plastic material.

8. An apparatus for extrusion covering a conductor with a plastic material, said apparatus comprising:
a die which includes a cavity and an exit orifice which communicates with said cavity through a passageway;
a core tube which is positioned within said die cavity;
moving means for advancing a conductor along a path of travel through the core tube, past an entrance of said passageway and through said passageway and said exit orifice of said die;
means for providing a supply of a plastic material at a location which is spaced from the path of travel; and
passage means for causing the plastic material to be directed from the supply radially inwardly toward the conductor, said passage means being disposed concentrically about and perpendicularly to the path of travel and having a width which is sufficiently small to minimize the distance along the path of travel through which the core tube can be moved before it engages a wall that defines the die and a length normal to the path of travel, the length and width being sufficient to provide a uniform distribution of the plastic material circumferentially about the conductor adjacent to the entrance of said passageway and to dissipate stress which have been induced in the plastic material.

9. An apparatus for extrusion covering a conductor with a plastic material, said apparatus comprising:
a die which includes a cavity defined by a wall which includes an exit orifice that communicates with said cavity through a passageway;
a core tube which is positioned within said die cavity;
moving means for advancing a conductor along a path of travel through said core tube, into a portion of said die cavity in which said core tube is positioned and along said passageway through said exit orifice of said die;
channel means for directing plastic material toward said die orifice, said channel means being defined between an outer surface of said core tube and an inner surface of said die; and
flow passage means for directing the plastic material from said channel means radially inwardly toward the conductor between an unsupported end of the core tube and an entrance to the passageway, said flow passage means being disposed concentrically with and perpendicularly to the path of travel and having a length normal to the conductor and a width in the direction of travel of the conductor which is sufficiently small to minimize the distance through which the core tube and be moved before it engages a wall that defines the die and which cooperates with the length to provide a uniform distribution of the plastic material circumferentially about the conductor adjacent to the entrance to said passageway and to dissipate stresses which have been induced in the plastic material.

10. The apparatus of claim 9, wherein said channel means converges toward the die orifice.

11. The apparatus of claim 9, wherein said channel means is parallel to the path of travel of the conductor.

12. The apparatus of claim 9, wherein said length and width of said passage have a ratio which falls in a range of 3 to 10.

13. The apparatus of claim 9, wherein surfaces of said die and of said core tube which define intersections of said flow passage means with said channel means and with said passageway are curved.

14. The apparatus of claim 9, wherein the conductor is enclosed in two concentric coatings of plastic material and said apparatus includes separate channel means and associated flow passage means for directing each plastic material independently toward the conductor.

15. An apparatus for extrusion covering a conductor with a plastic material, said apparatus including:

an extrusion head;

a die mounted at one end of said head and having an exit orifice which communicates through a passageway with a cavity of said die;

a core tube having an opening through which the conductor is advanced, said core tube being mounted in said cavity of said die with said opening in axial alignment with said exit orifice for guiding the conductor through said exit orifice and with an unsupported end of said core tube being positioned within said passageway, said die cavity having an inner surface which cooperates with an outer surface of said core tube to define a feed channel that extends generally toward said die orifice;

moving means for advancing a conductor along a path of travel through said core tube opening past an entrance to said passageway and out of said exit orifice;

means for moving a plastic material into and along said feed channel; and flow passage means for directing the plastic material from said feed channel radially inwardly toward said core tube, said flow passage means being disposed concentrically about and perpendicularly to the path of travel and having a length normal to the path of travel and a width which is the distance along the direction of travel of the conductor through which the core tube can be moved before it engages the wall which defines the die and which is sufficiently small to minimize the unsupported length of the core tube, the length and width being sufficient to provide a uniform distribution of the plastic material about the conductor adjacent to the entrance to said passageway and to dissipate stresses which have been induced in the plastic material.

16. The apparatus of claim 9, wherein the conductor is contacted by plastic material between an end of the core tube and the passageway and said flow passage means being annular and defined between an outer surface of the core tube and an inner surface of the die cavity, the width of the flow passage means being sufficiently small to minimize contact of the plastic material with the conductor within the die cavity to minimize tension in the conductor.

* * * * *